April 24, 1962
A. J. HONGO
3,031,562
MECHANICAL FEED FOR SOLDER GUN
Filed May 20, 1959
2 Sheets-Sheet 1
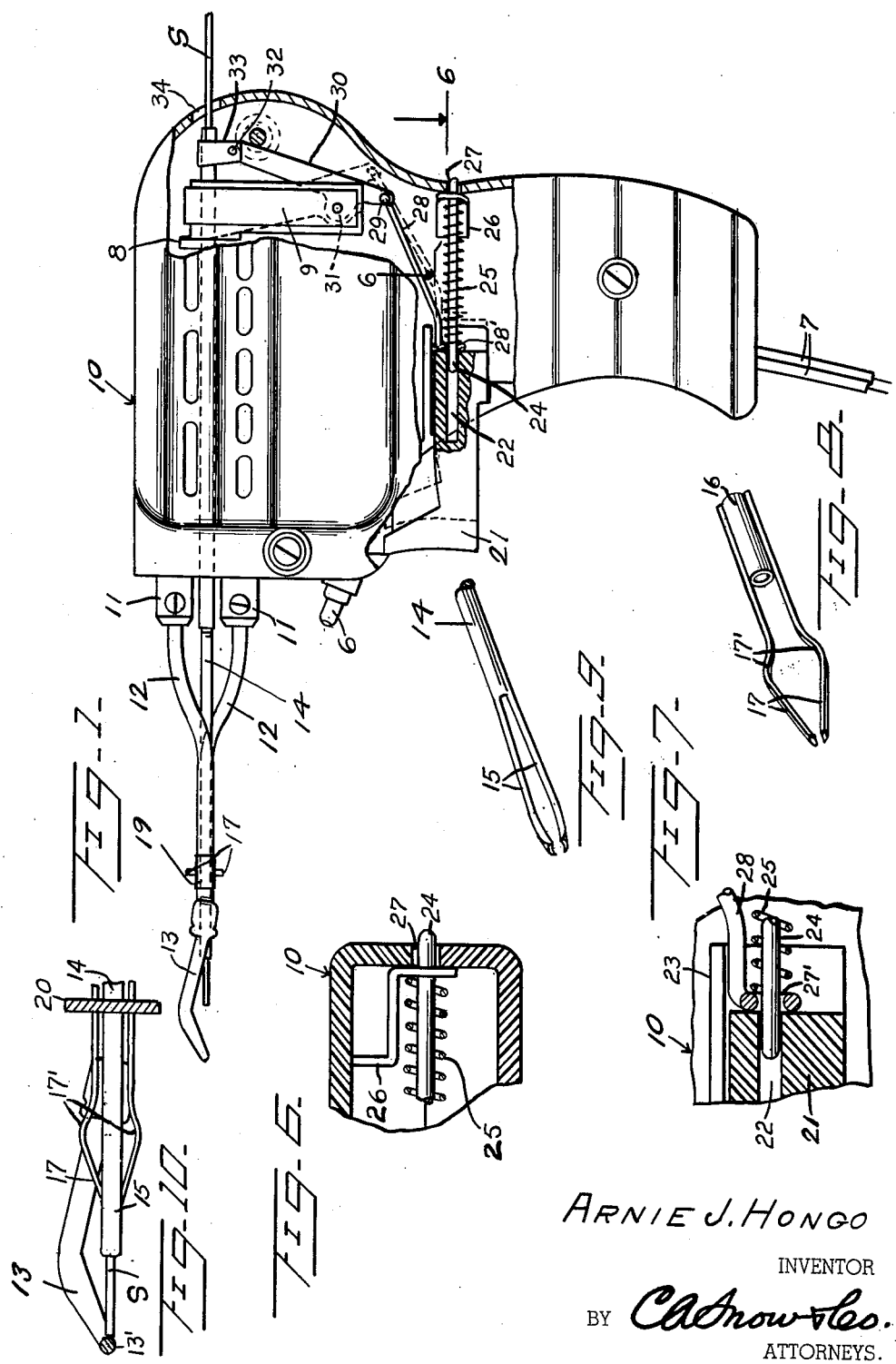
ARNIE J. HONGO
INVENTOR
BY *CA Snow & Co.*
ATTORNEYS.

April 24, 1962   A. J. HONGO   3,031,562
MECHANICAL FEED FOR SOLDER GUN
Filed May 20, 1959   2 Sheets-Sheet 2
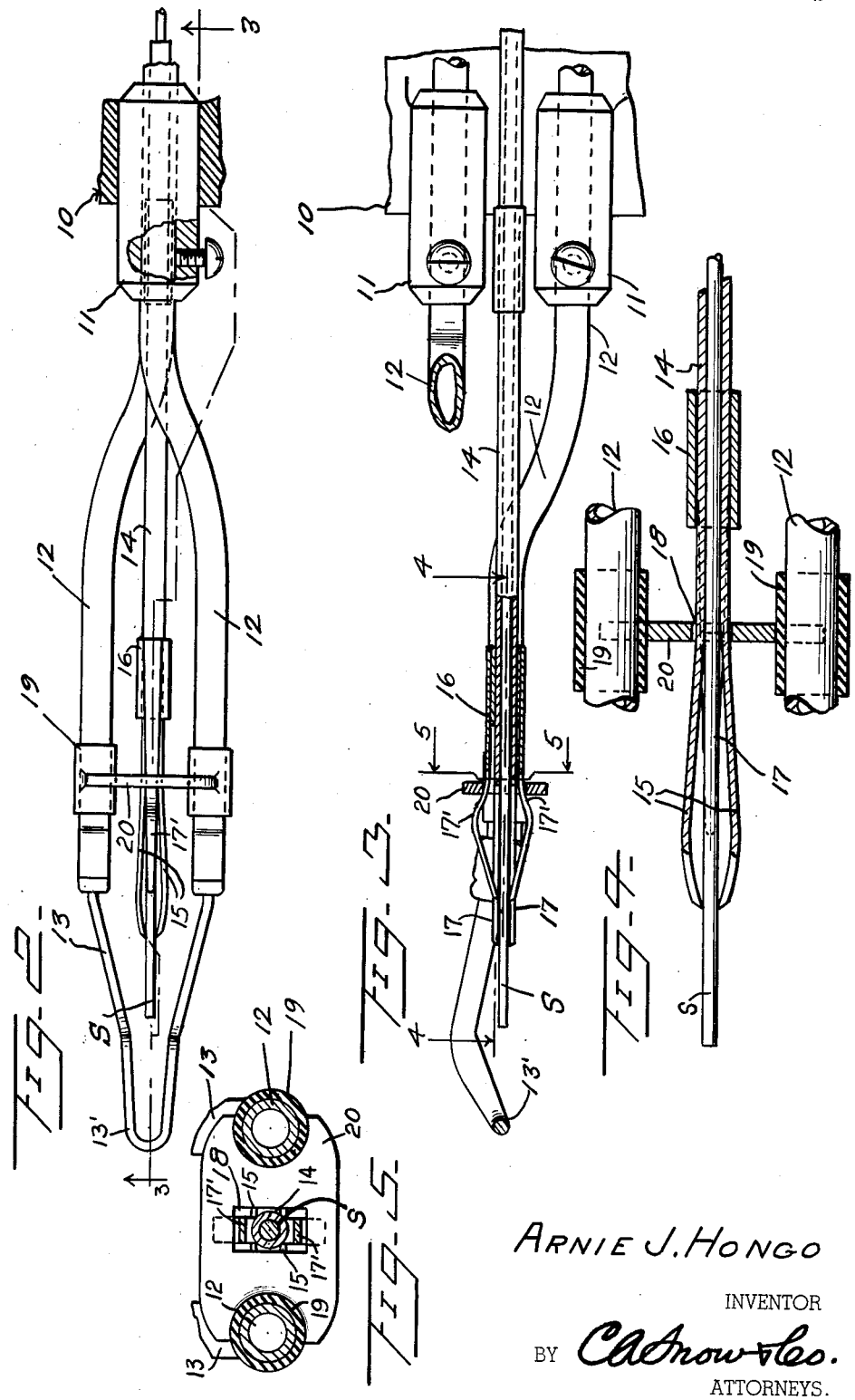
ARNIE J. HONGO
INVENTOR
BY
ATTORNEYS.

United States Patent Office 3,031,562
Patented Apr. 24, 1962

3,031,562
MECHANICAL FEED FOR SOLDER GUN
Arnie J. Hongo, McNeal, Ariz.
Filed May 20, 1959, Ser. No. 814,438
4 Claims. (Cl. 219—27)

This invention relates to soldering guns, and more particularly to a mechanical feed for feeding the solder wire to the heated tip of the soldering gun.

An important object of the present invention is to provide a solder wire feeding mechanism embodying feed jaws, which are so constructed and arranged that exceptionally short lengths of solder wire may be used, thereby reducing waste of the solder wire to a minimum.

Another object of the present invention is to provide means for accurately controlling the length of the solder wire fed to the heated tip by retracting the solder wire immediately upon release of the pressure on the trigger.

A still further object of the present invention is to provide a soldering gun, wherein the life of the tip may be prolonged, due to the fact that the solder wire may be readily fed to the tip for fast transfer of the heat to the work, thereby preventing overheating of the tip.

Still another object of the present invention is to provide supporting arms which extend from the casing of the soldering gun and are easily accessible for servicing or renewing.

An additional object of the present invention is the provision of a small narrow tip on the soldering gun with the solder wire feeding mechanism within same, thereby facilitating the use of the soldering tool to be used in restricted areas or in places difficult to reach with the conventional electric soldering iron or gun.

Still other objects, advantages and improvements will become apparent from the following specification, taken in connection with the accompanying drawings, in which:

FIGURE 1 is a side elevational view of a soldering gun equipped with a solder wire feeding mechanism in accordance with the present invention;

FIGURE 2 is a top plan view showing the arms which carry the soldering tip and the solder wire feeding mechanism according to the present invention positioned between same;

FIGURE 3 is partly a side elevation view and partly a sectional view, the latter being taken on the section line 3—3 of FIGURE 2 and looking in the direction of the arrows;

FIGURE 4 is a horizontal sectional view, taken on the section line 4—4 of FIGURE 3 and looking in the direction of the arrows;

FIGURE 5 is a transverse vertical sectional view, taken on the section line 5—5 of FIGURE 3 and looking in the direction of the arrows;

FIGURE 6 is a fragmentary horizontal detail sectional view, taken on the section line 6—6 of FIGURE 1 and looking in the direction of the arrows;

FIGURE 7 is an enlarged fragmentary detail view of the operating rod as shown in FIGURE 1;

FIGURE 8 is a perspective detail view of the sleeve, which carries one set of jaws;

FIGURE 9 is a perspective detail view of the solder wire receiving tube which carries another set of jaws; and FIGURE 10 is a detail side elevation view showing the solder wire carrying tube projected forwardly and the solder wire adjacent the soldering tip.

Referring now to the drawings in detail and to FIGURE 1 in particular, there is here shown a soldering gun which is designated generally by the reference numeral 12 applied to its casing. Within this casing there is a step down transformer, the core of which is partially shown at 9. A primary winding (not shown) is enclosed in the casing and mounted on the lower horizontal leg of the transformer. The primary circuit of this transformer is comprised in part by a pair of conductors, indicated at 7, which are connected to the primary winding and extend from the bottom of the casing. It will be understood that these conductors carry a plug (not shown) on their ends, which is adapted to be received in an outlet on a 110–120 volt A.C. power line.

A trigger 21, to be hereinafter more fully referred to, is slidably mounted in the casing 10 by a guide means 23 (FIG. 7) formed in the side walls of the latter. This trigger 21 is manually depressible rearwardly and is biased forwardly by a coiled compression spring 25. The trigger has a bore 22 extending lengthwise thereof and one end of a rod 24 is slidably received in this bore; the other end of the rod 24 is slidably received in a hole in one arm of double arm bracket 26 and extended through a hole 27 in the rear end of the casing 10. The bracket 26 is mounted within the casing by having its other arm secured to one inner side wall of the casing in any suitable manner, as shown in FIGURE 6. The coiled compression spring 25 surrounds the rod 23 with one end abutting the inner end of the trigger 21 and the other end abutting the first mentioned arm of the bracket 26.

An "On" and "Off" switch (not shown) is connected in the primary circuit of the transformer and this switch is operated by the trigger 21 being closed to complete the primary circuit when the trigger is depressed inwardly. Also, there is connected in the primary circuit a lamp 6, which is mounted on the front end of the casing 10. This lamp serves as an indicator to show when the power is on and also to illuminate the work being soldered.

The secondary winding of the transformer, which is partially shown at 8, is comprised by a single layer winding of heavy strap copper on the upper horizontal leg of the core. This winding is connected at its ends respectively to a pair of sockets 11—11, which are mounted on the front end of the casing 10. A pair of supporting arms 12—12, preferably of brass or copper, are respectively received in the sockets 11—11 and these are curved, first inwardly and then outwardly, into parallel relationship, as shown in FIGURE 2. The soldering tip 13, also being preferably of brass or copper, is secured on the outer ends of the arms 12—12 in any suitable manner, such as by having its ends received in axial holes in the ends of the arms 12—12 and the latter flattened on their sides. In top plan view (FIGURE 2) the sides of the soldering tip converge to the mid-section at an acute angle, then from the mid-section to the outer end at a lesser acute angle, and are united at their common forward end in a nose 13'. In side elevation view (FIG. 10), the soldering tip is sloped upwardly and outwardly to approximately its mid-section, and then downwardly and outwardly to the nose 13'.

The mechanism for feeding the solder wire S, according to the present invention, is mounted centrally intermediate the supporting arms 12—12 and rearwardly of the soldering tip 13. This mechanism is comprised in part by a wire receiving tube 14, which is slidably mounted in a hole (not shown) in the front of the casing 10 and in an aligned hole 34 in the rear of the casing. The solder wire S is fed into the tube 14 through this latter hole.

A bridge plate 20 is mounted between the supporting arms 12—12 and adjacent the forward ends of the latter. This plate is secured between the supporting arms by insulating sleeves 19—19. These sleeves are preferably force fitted on the supporting arms 12—12 and the bridge plate 20 has semi-circular slots in its opposite ends along its longitudinal center line by which it is force fitted between the sleeves. The tube 14 is formed with a slot along a diameter extending from its front end rearwardly, which slot provides a first pair of jaws 15—15. These jaws are received in sliding engagement with the sides of a rectangular hole 18 in the bridge plate 20 and thus serve as an additional guiding means for the tube in its sliding movement, as shown in FIGURE 4. At their outer ends the jaws 15—15 grip the solder wire S as it leaves the tube 19.

A sleeve 16 is slidably mounted through frictional engagement on the tube 14 to the rear of the bridge plate 20. This sleeve has thereon a second pair of jaws 17—17, which also extend through the hole 18 in the bridge plate 20. Adjacent their outer ends the jaws 17—17 have inverted and flattened V-shaped bends 17'—17' thereon. The sleeve 16, due to its frictional engagement with the tube 14, moves with the latter through part of the forward movement of the tube and is stopped by the arcuate end sections of the sleeve between the jaws 17—17 striking the bridge plate 20; conversely, the sleeve 16, again due to its frictional engagement with the tube 14, moves with the latter through part of the rearward movement of the tube and is stopped by the V-shaped bends 17'—17' in the jaws 17—17 striking the bridge plate 20.

The arrangement herein described is such that the longitudinal center lines of the jaws 15—15 are in one plane, for instance, a horizontal plane as shown in FIGURES 1 and 10, and the longitudinal center lines of the jaws 17—17 on the sleeve 16 are in a plane at right angles to the first plane, for instance, a vertical plane, as also shown in FIGURES 1 and 10. The jaws 17—17 therefore grip the solder wire S in the spaces between the jaws 15—15 and inwardly from the front ends of the latter.

The solder wire receiving tube 14 is moved forwardly and rearwardly by a mechanism operated by the trigger 21. A link 28 has an eye 28' on its lower end at right angles to the latter. This eye surrounds the rod 24 and is abutted by the trigger 21 on one side and the coiled compression spring 25 on the other side. At its upper end this link 28 is connected by a pivot 29 to the lower end of a lever 30, which is pivotally mounted at 31 on the inner face of one of the side walls of the casing 10. This lever 30 is in turn connected by a pivot 32 to a strap 33, which partially surrounds and is secured to the inner end of the solder wire receiving tube 14.

In operation, when the trigger 21 is in its normal position, as shown in FIGURE 1, both the pair of jaws 15—15 on the solder wire receiving tube 14 and the pair of jaws 17—17 on the sleeve 16 grip the solder wire S. The jaws 17—17 are held in engagement with the solder wire S by the wedging action of the hole 18 in the bridge plate 20 on the inverted V-shaped bends 17'—17' of the jaws. When the trigger 21 is depressed rearwardly, the switch (not shown) is operated and the primary circuit of the transformer is completed and the lamp 6 illuminated. The secondary circuit of the transformer is energized and the soldering tip 13 is heated. As the trigger 21 is depressed rearwardly, the link 28 is swung upwardly and outwardly, the lever 30 is pivoted in the counterclockwise direction (FIGURE 1), and the solder wire receiving tube 14 is projected forwardly. The sleeve 16, due to its frictional engagement with the solder wire receiving tube 14, is initially moved forwardly along with same. After a short period of such joint travel, the jaws 17—17 on the sleeve 16 are freed from engagement by their inverted V-shaped bends 17'—17' with the top and bottom of the rectangular hole 18 in the bridge plate 20, and these jaws no longer grip the solder wire S. The forward travel of the sleeve 16 is stopped by the arcuate end sections of the latter between the jaws 17—17 engaging the opposite sides of the rectangular hole 18 in the bridge plate 20. The solder wire receiving tube 14 now slides freely through the sleeve 16 and the solder wire S is carried by the jaws 15—15 on the tube 14 until its end is within the nose 13' of the heated soldering tip.

Upon completion of the soldering operation, the trigger 21 is released and the latter is moved forwardly by the coiled compression spring 25. The switch (not shown) is now opened, the primary circuit of the transformer is interrupted, the lamp 6 is extinguished, the secondary circuit is de-energized and the soldering tip 13 starts to cool down. Also, the link 28 is swung downwardly and inwardly and the lever 30 is pivoted in the clockwise direction (FIGURE 1). The solder wire receiving tube 14, solder wire S therein, and the sleeve 16, due to its frictional engagement with the tube 14, all begin to move rearwardly. At about the middle of the return movement of the trigger 21 the inverted V-shaped bends 17'—17' on the jaws 17—17 engage the two ends of the rectangular hole 18 in the bridge plate 20 and stop the rearward movement of the sleeve 16. Also, the engagement of the inverted V-shaped bends 17'—17' on the jaws 17—17 with the ends of the rectangular hole 18 forces these jaws to grip the solder wire S and stops the rearward movement of the latter. The solder wire receiving tube 14 continues to the limit of the rearward movement as the trigger 21 moves to the limit of its forward movement, as determined by the coiled compression spring 25. While both sets of jaws 15—15 on the tube 14 and 17—17 on the sleeve 16 grip the solder wire S during the initial part of the forward movement of the latter and the jaws 17—17 provide a firmer grip, the jaws 15—15 extend forwardly of the jaws 17—17 and hold the solder wire S during the soldering operation. Also, due to the provision of the jaws 15—15 in the stated relationship, the solder wire S can be used up to a shorter length than if only the jaws 17—17 would be present.

Having now fully described my invention, what I claim as new and useful and desire to secure by Letters Patent of the United States is:

1. In a soldering gun having a casing, a depressible trigger in the casing for operating the soldering gun, and a double armed soldering tip mounted on said casing, a bridge plate positioned between the soldering tip and the casing, a solder wire receiving tube positioned between the arms of said soldering tip and slidably mounted in the casing and slidably supported by the bridge plate and having a first set of jaws on its outer end for gripping the solder wire, a lever mechanism between the depressible trigger and the solder wire receiving tube for reciprocating the latter, and a sleeve mounted on said solder wire receiving tube in slidable and frictional engagement with same and movable forwardly with the solder wire receiving tube until engagement with the bridge plate, and having a second set of jaws thereon slidably extending beyond the bridge plate and movable rearwardly with the solder wire receiving tube until said second set of jaws abuts the bridge plate and grips the solder wire.

2. In a soldering gun having a casing, a depressible trigger in the casing for operating the soldering gun, parallel supporting arms mounted on said casing, and a double armed soldering tip mounted on said parallel supporting arms, a bridge plate mounted between the parallel supporting arms, a solder wire receiving tube slidably mounted in said casing and slidably supported by said bridge plate and having a first set of jaws on its outer end for gripping the solder wire, a lever mechanism between the depressible trigger and the solder wire receiving tube for reciprocating the latter, and a sleeve mounted on said solder wire receiving tube in slidable and frictional engagement with same and movable forwardly with the tube until engagement with the bridge plate, and having a second set of jaws thereon slidably extending beyond the bridge plate with outwardly extending sections on said second set of jaws, and movable rearwardly with the solder wire receiving tube until the outwardly extending sections on said second set of jaws abut the bridge plate and force the latter jaws to grip the solder wire.

3. In a soldering gun having a casing, a depressible trigger in the casing for operating the soldering gun, parallel supporting arms mounted on said casing, and a double armed soldering tip mounted on said parallel arms, a bridge plate having a hole therein mounted between the parallel supporting arms, a solder wire receiving tube slidably mounted in said casing and the hole in the bridge plate and having a first set of jaws on the outer end for gripping the solder wire, a lever mechanism between the depressible trigger and the solder wire receiving tube for reciprocating the latter, and a sleeve mounted on said solder wire receiving tube on one side of the bridge plate in slidable and frictional engagement with the tube and movable forwardly with the latter until engagement with the bridge plate, and having a second set of jaws thereon slidably extending through the hole in the bridge plate with outwardly extending sections on said second set of jaws, and movable rearwardly with the solder wire receiving tube until said outwardly extending sections engage in the hole in the bridge plate and force the latter jaws to grip the solder wire.

4. In a soldering gun having a casing, a depressible trigger in the casing for operating the soldering gun, parallel supporting arms mounted on said casing, and a double armed soldering tip mounted on said parallel supporting arms, a bridge plate having a hole therein mounted between the parallel supporting arms, a solder wire receiving tube slidably mounted in said casing and the hole in the bridge plate and having a first set of jaws on its outer end for gripping the solder wire, a lever mechanism between the depressible trigger and the solder wire receiving tube for reciprocating the latter, and a sleeve mounted on said solder wire receiving tube on one side of the bridge plate in slidable and frictional engagement with the tube and movable forwardly with the latter until engagement with the bridge plate and having a second set of jaws thereon slidably extending through the hole in the bridge plate and positioned at right angles to the first set of jaws on the solder wire receiving tube and outwardly extending sections on said second set of jaws, and movable rearwardly with the solder wire receiving tube until said outwardly extending sections engage in the hole in the bridge plate and force the latter jaws to grip the solder wire.

References Cited in the file of this patent

UNITED STATES PATENTS

| | | |
|---|---|---|
| 1,631,063 | Rognley | May 31, 1927 |
| 2,454,875 | Hyde | Nov. 30, 1948 |
| 2,604,571 | Naulty et al. | July 22, 1952 |
| 2,843,073 | Voss et al. | July 15, 1958 |